United States Patent
Turányi et al.

(10) Patent No.: US 9,769,852 B2
(45) Date of Patent: Sep. 19, 2017

(54) MAINTAINING CURRENT CELL LOCATION INFORMATION IN A CELLULAR ACCESS NETWORK

(75) Inventors: Zoltán Richárd Turányi, Szentendre (HU); Attila Mihály, Dunakeszi (HU); György Miklós, Pilisborosjeno (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

(21) Appl. No.: 13/263,911

(22) PCT Filed: Apr. 21, 2010

(86) PCT No.: PCT/IB2010/051758
§ 371 (c)(1),
(2), (4) Date: Dec. 12, 2011

(87) PCT Pub. No.: WO2010/122511
PCT Pub. Date: Oct. 28, 2010

(65) Prior Publication Data
US 2012/0076047 A1    Mar. 29, 2012

Related U.S. Application Data

(60) Provisional application No. 61/171,926, filed on Apr. 23, 2009.

(51) Int. Cl.
*H04W 76/02*    (2009.01)
*H04W 28/02*    (2009.01)
(Continued)

(52) U.S. Cl.
CPC ............. *H04W 76/02* (2013.01); *H04L 12/26* (2013.01); *H04L 12/287* (2013.01); *H04W 8/082* (2013.01);
(Continued)

(58) Field of Classification Search
None
See application file for complete search history.

(56) References Cited

U.S. PATENT DOCUMENTS

2008/0259873 A1* 10/2008 Ahmavaara ....... H04W 36/0033
370/331
2009/0232019 A1*  9/2009 Gupta .................. H04L 12/287
370/252
(Continued)

FOREIGN PATENT DOCUMENTS

FI    WO 2008125729 A1 * 10/2008 ............ H04W 8/082
HK    WO 2010122511 A1 * 10/2010 ............ H04W 76/02
(Continued)

OTHER PUBLICATIONS

Vodafone "Local Breakout and Home(e) NodeB". TD S2-092301 3GPP SA WG2 Meeting #72, Mar. 30-Apr. 3, 2009, Hangzhou, China_.*

(Continued)

*Primary Examiner* — Christopher Wyllie
(74) *Attorney, Agent, or Firm* — Baker Botts, LLP

(57) ABSTRACT

A method, femto Base Station, and network service node for connecting a User Equipment UE, to local devices in a local network. The femtoBS includes a femtoBS part and a Packet Data Network Gateway, PDN-GW, part comprising a subset of PDN-GW functions. The UE sends a PDN connection request that includes a special Access Point Name, APN, which indicates the request ts for local IP access. The network service node, such as a Mobility Management Entity, MME1 includes a gateway selection mechanism that, based on the special APN1 selects the PDN GW part of the femtoBS device to serve the connection. A route optimization function in the femtoBS shortcuts the traffic between the femtoBS part and the PDN GW part, providing direct access
(Continued)

to the local network. The UE may access the Internet through a residential gateway in the local network and a fixed access connection.

12 Claims, 5 Drawing Sheets

(51) Int. Cl.
  *H04L 12/26* (2006.01)
  *H04L 12/28* (2006.01)
  *H04W 8/08* (2009.01)
  *H04W 76/04* (2009.01)

(52) U.S. Cl.
  CPC ...... *H04W 28/0268* (2013.01); *H04W 76/041* (2013.01)

(56) References Cited

U.S. PATENT DOCUMENTS

| | | | |
|---|---|---|---|
| 2010/0274878 A1* | 10/2010 | Yin ............... | H04L 61/1515 709/222 |
| 2011/0038318 A1* | 2/2011 | Parsons ............ | H04W 80/04 370/328 |
| 2011/0292896 A1* | 12/2011 | Yeuom ............. | H04W 8/082 370/329 |
| 2012/0003980 A1* | 1/2012 | Lim ............... | H04W 76/022 455/445 |
| 2012/0076047 A1* | 3/2012 | Turanyi ............ | H04W 76/02 370/254 |
| 2012/0269162 A1* | 10/2012 | Vesterinen ......... | H04W 8/082 370/331 |
| 2013/0121298 A1* | 5/2013 | Rune .............. | H04L 29/12066 370/329 |
| 2014/0059192 A1* | 2/2014 | Miklos ............. | H04W 8/082 709/221 |

FOREIGN PATENT DOCUMENTS

| | | |
|---|---|---|
| WO | WO 2008/125729 | 10/2008 |
| WO | 2010/039084 A1 | 4/2010 |
| WO | 2010/039085 A1 | 4/2010 |
| WO | 2010039084 | 4/2010 |
| WO | 2010039085 | 4/2010 |

OTHER PUBLICATIONS

"LTE Local Breakout for Home eNB", R3-083198, 3GPP TSG-RAN WG3 Meeting #62, Praqgue, Czech Republic, Nov. 10-Nov. 14, 2008_.*
"Local IP access for EHNB", TD S2-087493 3GPP TSG SA WG2 Meeting #69, Nov. 17-21, 2008.*
International Search Report for PCT/IB2010/051758 mailed Sep. 21, 2010.
Written Opinion of the International Searching Authority mailed Sep. 21, 2010.
International Preliminary Report on Patentability dated Aug. 4, 2011.
Vodafone "Local Breakout and Home(e) NodeB". TD S2-092301 3GPP SA WG2 Meeting #72, Mar. 30-Apr. 3, 2009, Hangzhou, China.
"LTE Local Breakout for Home eNB", R3-083198, 3GPP TSG-RAN WG3 Meeting #62, Praqgue, Czech Republic, Nov. 10-Nov. 14, 2008.
3GPP TSG SA WG2 Meeting #72 Contribution, Mar. 30-Apr. 3, 2009, Hangzhou, China.
Johan Rune, U.S. Appl. No. 61/101,726, filed Oct. 1, 2008, Method and Arrangement in a Telecommunication System.
Johan Rune, U.S. Appl. No. 61/101,797, filed Oct. 1, 2008, Method and Arrangement in a Telecommunication System.

* cited by examiner ature_field>>

MAINTAINING CURRENT CELL LOCATION INFORMATION IN A CELLULAR ACCESS NETWORK

RELATED APPLICATIONS

This application is the U.S. national phase of International Application No. PCT/IB2010/051758 filed 21 Apr. 2010 which designated the U.S. and claims priority to U.S. 61/171,926 filed 23 Apr. 2009, the entire contents of each of which are hereby incorporated by reference.

TECHNICAL FIELD

The present invention relates generally to communication networks, and in particular, to a system and method for enabling a User Equipment (UE) to directly access local devices in a local network through a femto Base Station (femtoBS).

BACKGROUND

The following abbreviations are utilized throughout this document:
3GPP Third Generation Partnership Project
ALG Application Layer Gateway
APN Access Point Name
CPE Customer Premises Equipment
CSG Closed Subscription Groups
DHCP Dynamic Host Configuration Protocol
DNS Domain Name Server
DSL Digital Subscriber Line
EBI EPS Bearer ID
ECGI E-UTRAN Cell Global Identity
eNB evolved Node B
EPC Evolved Packet Core
EPS Evolved Packet System
E-UTRAN Evolved Universal Terrestrial Radio Access Network
femtoBS femto Base Station
FMC Fixed Mobile Convergence
FTTH Fiber to the Home
GERAN GSM/Edge Radio Access Network
GGSN Gateway GPRS Support Node
GRE Generic Routing Encapsulation
GTP GPRS Tunneling Protocol
GW Gateway
HNB Home Node B
HeNB Home Evolved Node B
IP Internet Protocol
IMSI International Mobile Station Identifier
ISP Internet Service Provider
ISR Idle State signaling Reduction
LBO Local Breakout
LIPA Local IP Access
LTE Long Term Evolution
MME Mobility Management Entity
MSC Mobile Switching Center
NAS Non Access Stratum
NAT Network Address Translation/Translator
OMA DM Open Mobile Alliance Device Management
PCC Policy and Charging Control
PDN Packet Data Network
PGW PDN Gateway
PMIP Proxy Mobile IP
PON Passive Optical Network
RAT Radio Access Technology
RBS Radio Base Station
RRC Radio Resource Control
SAE System Architecture Evolution
SEGW Security Gateway
SGSN Serving GPRS Support Node
SGW Serving Gateway
SIPTO Selected IP Traffic Offload
TAI Tracking Area Identity
TAU Tracking Area Update
TEID Tunnel Endpoint Identifier
UE User Equipment
UMTS Universal Mobile Telecommunication System
UTRAN Universal Terrestrial Radio Access Network The Third Generation Partnership Project (3GPP) is currently standardizing a concept referred to as a home base station. A residential subscriber may subscribe to a fixed access solution such as DSL. A mobile operator may then sell the subscriber a home base station, also referred to interchangeably as a femto base station (femto BS), which the subscriber attaches at home to his residential fixed access gateway.

The home base station connects to the operator's network via a secure tunnel (supposedly IPsec protected) to a security gateway (SEGW) at the border of the operator's network. Via the SEGW the home base station has connectivity with core network nodes such as a Mobility Management Entity (MME) and a Serving Gateway (SGW) using the S1 interface in the Evolved Packet System (EPS). Also, an optional HeNB GW may be used. In the 3G Universal Mobile Telecommunication System (UMTS), the home base station connect to the HNB GW via the SEGW, which has connectivity with the Serving GPRS Support Node (SGSN) and Mobile Switching Center (MSC) via the Iu interface.

A problem with the home RBS solution is that the standard for Local IP Access (LIPA) has not yet been finalized. LIPA provides for connecting the UE directly to local devices (i.e., devices in the residential network). Additionally, it is possible to access the Internet directly through the fixed DSL network utilizing Selected IP Traffic Offload (SIPTO). The reason for the second capability is to offload Internet traffic from the mobile operator's network and thus lower cost (in a flat charging model best effort Internet traffic would not increase the mobile operator's revenue). A good technical solution would allow simultaneous access to the Evolved Packet Core (EPC), local devices, and the Internet via the Internet Service Provider (ISP).

Another related problem is how to provide remote access to the local devices for a closed group of customers. This problem arises in a large number of use cases when there are many IP-enabled home appliances.

In one solution described in U.S. Patent Application No. 61/101,726 entitled, "Local Breakout in Home (e)Node B" by Telefonaktiebolaget LM Ericsson, a novel femtoBS function snoops the destination address in the IP headers of uplink packets from the UE, identifies locally destined packets, and forwards the locally destined packets to the local CPE network instead of into the IPsec tunnel towards the 3GPP network. This solution has the advantage that it does not impact the UE, which can use the same address and PDN connection as assigned by the 3GPP operator. However the solution requires non-trivial mechanisms to identify the traffic to be broken out locally, and does not address the possible situation in which the 3GPP operator assigns private addresses to the UE that may overlap with the address range used in the residential network. Such an overlap cannot be excluded, and setting up the address translation rules for such a scenario may be quite complex. In addition, Network Address Translation (NAT) also requires an Application Layer Gateway (ALG) in order to run specific applications in the local network, and also the user/UE is not able to indicate on a case by case basis whether it wants a certain Internet session/traffic flow to be routed directly via the broadband access network or via the 3GPP core network.

Another solution for the home RBS problem is described in U.S. Patent Application No. 61/101,797 entitled, "Local Breakout in HeNB with UE and HeNB Support" by Telefonaktiebolaget LM Ericsson. This solution is based on explicit signaling between the UE and the femtoBS to establish a separate bearer for LBO traffic. Two embodiments of the solution are described. A first embodiment integrates the signaling for local bearer establishment into RRC signaling, while the second embodiment integrates this signaling into NAS signaling (where the femtoBS snoops the NAS signaling message and infers the intention for local bearer establishment by UE). A disadvantage of the first embodiment is that it requires specific UE functionality and standardization, while a disadvantage of the second embodiment is that snooping of encrypted NAS messages is not possible.

Neither solution above offers the capability to remotely access the residential network.

A recent Qualcomm proposal in 3GPP proposed a solution for local access with a "Local" Serving GW and a PDN GW in the HeNB including signaling to the MME and a new interface to the GWs in the HeNB. This solution, however, has problems relating to the Serving GW placement in the femtoBS. First, this would violate the current SAE architecture assumption wherein currently there is only a single SGW assigned for the UE. Assigning a second SGW would affect all the mobility procedures due to the need to set up and release the additional SGW. Impacting all of the connected and idle mode mobility procedures has significant disadvantages. Second, if the Serving GW is placed in the femtoBS, many more S11 interfaces will be required between the MME and local Serving GWs. Finally, since the Serving GW is a common node for a UE moving between E-UTRAN and UTRAN/GERAN access, the Serving GW in the femtoBS would be required to have an interface to the SGSN and the RNC in case of a direct tunnel as well. Such a direct interface between the home node and the SGSN/RNC in the operator's network may be problematic to deploy.

Another variant has been proposed by Vodafone in "Local Breakout and Home (e)NodeB," 3GPP SA WG2 temporary document S2-092301, and by Nortel in temporary document S2-092355. This proposal collocates the SGW and PDN Gateway with the HeNB, but provides only a single SGW for the UE. The SGW is relocated each time the UE moves to the home cell. This solution avoids the architecture impacts related to having two SGWs, but raises several other problems. For example, moving in and out of femto cells would be visible to the PDN GW, which would require extra signaling. In the roaming case, for instance, the home network would see signaling each time the UE moves in or out of the home cell. This problem is especially bad in the open access or campus scenarios.

The Vodafone/Nortel proposal also hinders Tracking Area Update (TAU) optimizations. With this solution, a Tracking Area Identity (TAI) list, which includes both the home cell and the surrounding macro cell, cannot be assigned to the UE since the proposal would require an SGW change and a TAU whenever the UE enters or leaves the home cell. The TAI list feature is quite important to reduce TAU signaling, especially in this scenario. Additionally, Idle State signaling Reduction (ISR) cannot be used with this solution. 3GPP has defined the complex ISR feature to reduce TAU signaling, and a scenario of home LTE cell with 2G/3G macro coverage (or 3G home cell with LTE macro coverage) is one where ISR seems most usable. However, the Vodafone/Nortel proposal would render ISR unusable since ISR requires a common SGW for both the home cell and the macro cells of the other Radio Access Technology (RAT).

Another issue is that the UE does not know before moving into the home cell whether local IP connectivity will be used. There may be many users who do not use local IP connectivity for whom SGW relocation would be unnecessary. With the Vodafone/Nortel proposal, there is no way to know this before the UE starts a mobility procedure into the home cell, and thus if the user does not intend to use local IP connectivity, the procedure may be done unnecessarily.

SUMMARY

The present invention eliminates the drawbacks of the Qualcomm and Vodafone/Nortel proposals while providing a solution that (1) enables the UE to be connected directly to local devices (i.e., devices in the residential network), (2) enables the UE to access the Internet directly through the fixed DSL network, and (3) provides remote access to the local devices for a closed group of customers.

In one embodiment, the present invention utilizes a special Access Point Name (APN) referred to herein as a "residential APN" that enables users to connect to the residential network (connected to the femtoBS). A subset of PDN GW functions are located in the femtoBS, and a novel selection mechanism in the MME enables the selection of a user-customizable PDN GW for the residential APN. For example, the selected PDN GW may be configured on a per-IMSI basis, or the current femtoBS may also be used as a PDN GW. The SGW functionality is not part of the femtoBS, and the single SGW remains unchanged in the 3GPP operator's network. A route optimization function in the femtoBS shortcuts the traffic between the femtoBS and the PDN GW contained in it, bypassing the Serving GW.

Thus, in one embodiment, the present invention is directed to a method of connecting a wireless communication device through a femtoBS device to local devices in a local network. The method includes receiving in the femtoBS device, a request from the wireless communication device to establish a packet-switched data connection to a 3GPP operator network; and forwarding the connection request to a service node in the 3GPP operator network. The femtoBS device includes a femtoBS part and a gateway part, the gateway part comprising a subset of 3GPP operator network gateway functions implemented in, or in communication with, the femtoBS part. The method also includes determining by the service node that the request is for local IP access; activating a gateway selection mechanism in the service node in response to determining that the request is for local IP access, and selecting the gateway part of the femtoBS device to serve the connection; and upon establishment of the connection, routing traffic directly between the femtoBS part and the gateway part of the femtoBS device while bypassing a serving gateway (SGW) implemented solely in the 3GPP operator network, the gateway part providing direct access to the local network.

In another embodiment, the present invention is directed to a femtoBS device for connecting a wireless communication device to local devices in a local network. The femtoBS device includes a femtoBS part which includes communication means for receiving a request from the wireless communication device to establish a packet-switched data connection to a 3GPP operator network and for forwarding the request to a service node in the 3GPP operator network. The femtoBS device also includes a gateway part implemented in, or in communication with, the femtoBS part, the gateway part comprising a subset of 3GPP operator network gateway functions; communication means for receiving from the service node in the 3GPP operator network, an indication that the gateway part of the femtoBS has been selected to serve the data connection; and means for bypassing a serving gateway, SGW, implemented solely in the 3GPP operator network, wherein the means for bypassing the SGW routes traffic directly between the femtoBS part and the gateway part of the femtoBS device upon establishment of the data connection, the gateway part providing direct access to the local network.

In another embodiment, the present invention is directed to a service node in a 3GPP operator network for controlling establishment of a packet-switched data connection for a wireless communication device through a femtoBS device. The service node includes communication means for receiving from the femtoBS device, a request by the wireless communication device for a packet-switched data connection to the 3GPP operator network; means for determining that the request is for local IP access; a gateway selection mechanism, responsive to a determination that the request is for local IP access, for selecting a gateway part of the femtoBS device to serve the connection, the gateway part comprising a subset of 3GPP operator network gateway functions; and communication means for sending an indication to the femtoBS device that the gateway part of the femtoBS device has been selected to serve the connection, thereby enabling the femtoBS device to bypass a serving gateway, SGW, implemented solely in the 3GPP operator network by routing traffic directly between a femtoBS part and the gateway part of the femtoBS device upon establishment of the data connection.

DETAILED DESCRIPTION

Figure 1:
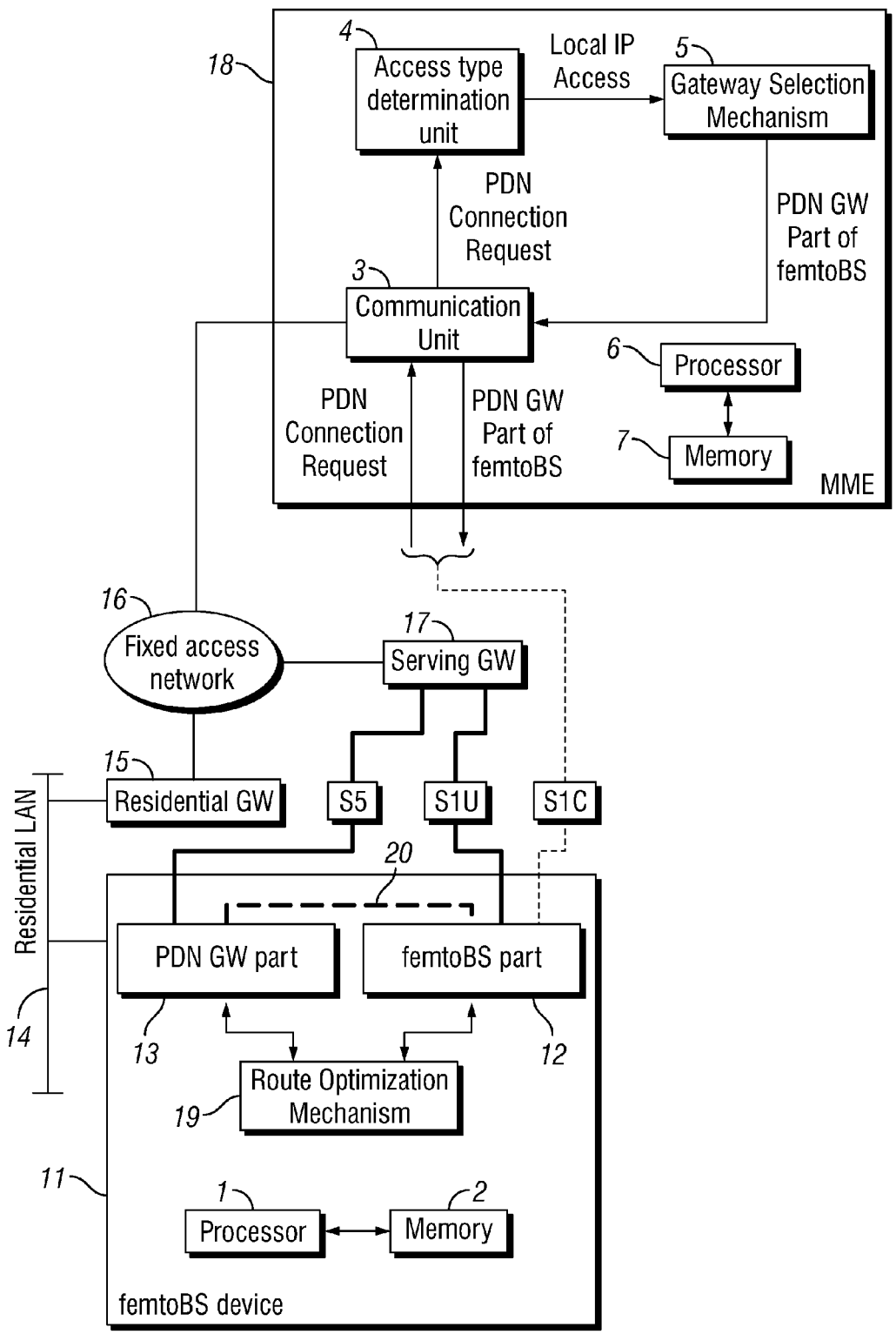
FIG. 1 is a simplified block diagram of an exemplary embodiment of the system of the present invention.

As noted above, home base stations connect to the operator's network via a secure tunnel (supposedly IPsec protected) to an SEGW at the border of the operator's network. The following description focuses on this scenario. It should be understood, however, that the present invention is also useful in other scenarios such as the business scenario of a Fixed Mobile Convergence (FMC) operator owning both fixed and wireless accesses, or for operators desiring to offload Internet traffic from their networks as early as possible. The RBSs with fixed connectivity are referred to herein as femtoBSs, and the radio cell of a femto BS is referred to as a femtocell. The femtoBS is referred to as a Home eNB (HeNB) or home node in 3GPP specifications, and the femtocell is referred to as a home cell.

In one embodiment, the present invention utilizes an Access Point Name (APN) referred to herein as a "residential APN" that enables users to connect to the local residential network (connected to the femtoBS). The use of the term "residential" herein should not be construed as limiting the invention to a residence; the term is intended to cover any specifically located femtoBS deployment.

The UE uses the residential APN to identify that the UE wants to open a PDN connection for Local IP access. Types of access that can be utilized include:

Remote access: The user has set up a Home eNB of its own, and would like to get access at that Home eNB either from the home cell of that Home eNB, or remotely from another location.

Local access: The user would like to get Local IP access at the current Home eNB, whether or not the user is the owner of that eNodeB.

Both types can be utilized, and can be enabled/disabled separately. The UE may use a different residential APN to differentiate the two access types (e.g., "remote access" or "local access"). The HeNB owner can control which options are enabled/disabled, and the UE may become aware of this, for example, by Open Mobile Alliance Device Management (OMA DM) or by appropriate success/error codes when the PDN connection is established.

For the case of remote access, the UE may attach to the residential network at any time, from any location. The UE may also open a PDN connection to the residential network in addition to the UE's existing sessions. (As used herein, when it is stated that the UE opens a PDN connection, this procedure is understood to also include the initial attach procedure.) The MME serving the UE detects the connection request to the residential network and activates the novel PDN GW selection mechanism (Serving GW selection is not impacted).

As noted, a small user-customizable subset of PDN GW functions is implemented in the femtoBS, or in proximity to the femtoBS in the local network and a novel selection mechanism in the MME enables the selection selected PDN GW can be configured on a per-IMSI basis, or the current femtoBS may also be used as a PDN GW. In other words, a selection algorithm in the MME may be configured based on the IMSI of the user. Users that should have access to the local residential network (for example, because they live there) are configured with an algorithm that selects the home eNodeB (i.e., femtoBS) as the PDN GW. This enables UE access to the local network. Other users are configured with an algorithm that selects another PDN GW.

The SGW functionality is not part of the femtoBS, and the single SGW remains unchanged in the 3GPP operator's network. In a novel aspect, a route optimization function in the femtoBS shortcuts the traffic between the femtoBS and the PDN GW contained in it, bypassing the Serving GW in the operator's core network.

The mechanism has a configurable database containing the identity of the femtoBS for each IMSI that can connect to the residential API. This database may be combined with the HSS or other database storing other subscriber information related to Home eNB subscribers such as the allowed Closed Subscription Groups (CSG) list. The PDN GW identity/address may be set up either by O&M, or the address of the PDN GW may be sent at S1 setup to the MME which can then store this address in the database. This database may be of any structure (e.g., user groups, etc.). The MME selects the femtoBS as the PEN GW for the IMSI that opens the PDN session.

For the case of local access, the MME selects a PDN GW identity/address based on the UE's current Home eNB, which may be known from O&M or sent over the S1 interface. This may be accomplished, for example, as follows:

The IP address of the PDN GW (which in this case is the IP address of the home eNodeB) may be carried in the S1-AP message sent between the eNodeB and the MME for a new PDN Connectivity Request (attach). However, the Home eNB may not know when such a message is sent since NAS messages are encrypted. Therefore, the Home eNB needs to send the IP address of the PDN GW in all UPLINK NAS TRANSPORT or INITIAL UE MESSAGE S1-AP messages. It should be noted that the home eNodeB may use a different IP address for its home eNodeB function and for its PDN GW function, and that these functions may be implemented in separate locations.

The MME may query the Home NB for the PDN GW address. This may be done with an S1-AP message from the MME to the Home eNB (possibly via the HeNB GW), and a response, The association between the PDN GW address and the E-UTRAN Cell Global Identity (ECGI) are stored in the network, for example in the HeNB GW. This association is updated each time the S1 connection is set up. The MME knows the UE's current ECGI, and maps it to the PDN GW address when a new PDN connection for local access is set up. This may be done, for example, by a DNS query to the HeNB GW to resolve the ECGI into a PDN GW address. The DNS lookup may include a string such as "pgw-address.ECGI.HeNB-GW-id", where HeNB-GW-id is the eNB identity of the HeNB GW.

The MME uses the S1 interface destination address as the PGW address. For the case in which an HeNB GW is used, this leads to the MME sending a Create Session Request message to the SOW, which forwards it to the HeNB GW. The HeNB GW can then determine the proper HeNB and forward the message to it. This determination may be based on mapping the ECGI to the correct HeNB as above. The HeNB may include the proper PGW address in the Create Session Response message, and that address is then used by the SGW and MME.

For the case when a HeNB GW is not used, the Create Session Request may go directly from the SGW to the HeNB.

This allows the femtoBS device (containing the PDN GW) to connect the UE directly to the residential GW. In this particular case the PDN GW should acquire an IP address for the user, for example, via a Dynamic Host Configuration Protocol (DHCP) request within the residential network (potentially answered by the residential GW of the user or by the fixed network).

Thus the IP address of the UE is from the IP address range of the residential network, and any packets the UE sends on the residential APN end up in the residential network. Also, packets sent to the IP address of the UE by devices in the residential network, are sent to the PDN GW of the UE. To achieve this, the PDN GW in the femtoBS replies to ARP requests by sending its own MAC address to the UE's IP address. Packets sent between the UE and the residential network, however, still go through the serving GW, potentially located in the 3GPP operator's network. If the user is actually located at the femto cell, such traffic would load the fixed access link twice. In order to remove this inefficiency, the femtoBS may shortcut the traffic (which is effectively sent between its femtoBS part and its PDN GW part). It should be noted that the term "DSL link" is used herein interchangeably with the term "fixed access link", and is understood to include other access technologies such as PON or FTTH.

FIG. 1 is a simplified block diagram of an exemplary embodiment of the system of the present invention. The system includes a femtoBS device 11, which includes a femtoBS part 12 and a PDN GW part 13. The femtoBS device is connected via a residential LAN 14 to a residential gateway 15, which provides fixed access through a fixed access network 16 to a Serving GW (SGW) 17 and an MME 18 in a core network. A route optimization mechanism 19 establishes a traffic shortcut 20 between the femtoBS part and the PDN GW part. The traffic shortcut is shown using a thick dashed line. The lines labeled S1U and S5 represent the GTP tunnels to and from the Serving GW being shortcut. The S1C dashed line to the MME represents a control plane connection and solid lines represent physical connections. The femtoBS device pairs the GTP tunnel on the femtoBS part with the GTP tunnel on the PDN GW part that collectively implement the (default and/or dedicated) bearer for the residential APN. The pairing is needed because more than one user may be using the femtoBS. Operation of the femtoBS device and its various components may be controlled by a processor 1 executing computer program instructions stored on a memory 2.

The MME 18 includes a communication unit 3 for receiving from the femtoBS device 11, a PON connection request from a UE. The request is sent to an access type determination unit 4, which determines whether the connection request is a standard request to access a public network such as a 3GPP operator network, or is a request for local IP access. The determination may be made based on the residential APN, the IMSI of the UE, or another suitable indication. When the request is for local IP access, a gateway selection mechanism 5 selects the PDN GW part 13 of the femtoBS device to serve the connection. The communication unit 3 then sends an indication to the femtoBS device that the PDN GW part of the femtoBS device has been selected to serve the connection. Operation of the MME and its various components may be controlled by a processor 6 executing computer program instructions stored on a memory 7.

The femtoBS performs the pairing of the GTP tunnels utilizing one or a combination of the following methods:

The MME may attach one identifier already present on the S5 interface to the bearer setup message over S1 in the case of a Local IP access connection for the femtoBS. The identifier may be the Tunnel Endpoint Identifier (TEID) used for the uplink at the PDN GW, which is already sent to the MME. In case of multiple bearers, the uplink TEID for each bearer (identified by its bearer ID) may be included. Alternatively, only a single uplink TEID may be utilized for each PDN connection, and the bearers within the PDN connection may be identified by the bearer ID. Both control plane and user plane PDN GW TEID may be utilized.

Other alternative identifiers include, for example, the APN and IMSI together with the EPS Bearer ID (EBI) already present on S1-C. Such a combination would unambiguously identify bearers. As another alternative, a new field on S5 and S11 may be defined for this purpose, although this would impact the S5/S11 definition. The femtoBS can then perform the matching based on the value of this field. This alternative also impacts the S1AP protocol.

The PDN GW part of the femtoBS may send a specially formatted packet on the established tunnel in the downlink direction. This packet will arrive on the GTP tunnel at the femtoBS part from the Serving GW. The femtoBS part can detect the specially formatted packet and remove it from the bearer. This method does not require any changes except in the femtoBS. However, in this case the MME has no control over whether the optimization is turned on or off, and it must be ensured that the specially formatted packet does not cause any error if it arrives at another node.

If there are contexts in the PDN GW part and the femtoBS part that are candidates for pairing, the initial traffic (including user plane IP and transport headers, but excluding GTP and outer IP headers) may be cached to determine whether it later re-appears at the same node. If bitwise-identical traffic appears, this suggests pairing. By allowing a sufficiently high number of bits to match, the probability of false pairing detection can be lowered to a negligible level. This approach does not require any protocol impact, although it introduces a degree of latency in the pairing process and also implies potential extra reordering.

The femtoBS device receives S1AP and S5 messages corresponding to a bearer relatively close in time. This allows a femtoBS device to pair the S1 and S5 GTP tunnels for the same bearer. If one UE hands over into the femtocell with multiple bearers already established to the residential APN, the femtoBS may receive multiple bearers at the same time. In that case, the timing with which the bearers are received indicates to the femtoBS that these bearers all belong to the same UE. The femtoBS can then use the EBI parameter (present both on S1 and S5) to map the multiple bearers of the same UE, provided, however, that multiple UEs do not hand over into the femtocell at the same time.

It should be noted that the pairing may be done for more than one pair of GTP tunnels if the UE has multiple bearers towards the residential APN. This is also true using PDN GW uplink TEID-based pairing, or with the other approaches. This enables, for example, streaming content from a residential media store with high quality.

For Proxy Mobile IP (PMIP)-based S5/S8, the pairing can also be done based on the Generic Routing Encapsulation (GRE) key instead of the TEID. For PMIP-based S5/S8, it is unlikely that more than one bearer would be used per connection, since that would require a complex implementation in which the Policy and Charging control (PCC) infrastructure is in place for the PDN GW part of the femtoBS.

Figure 2:
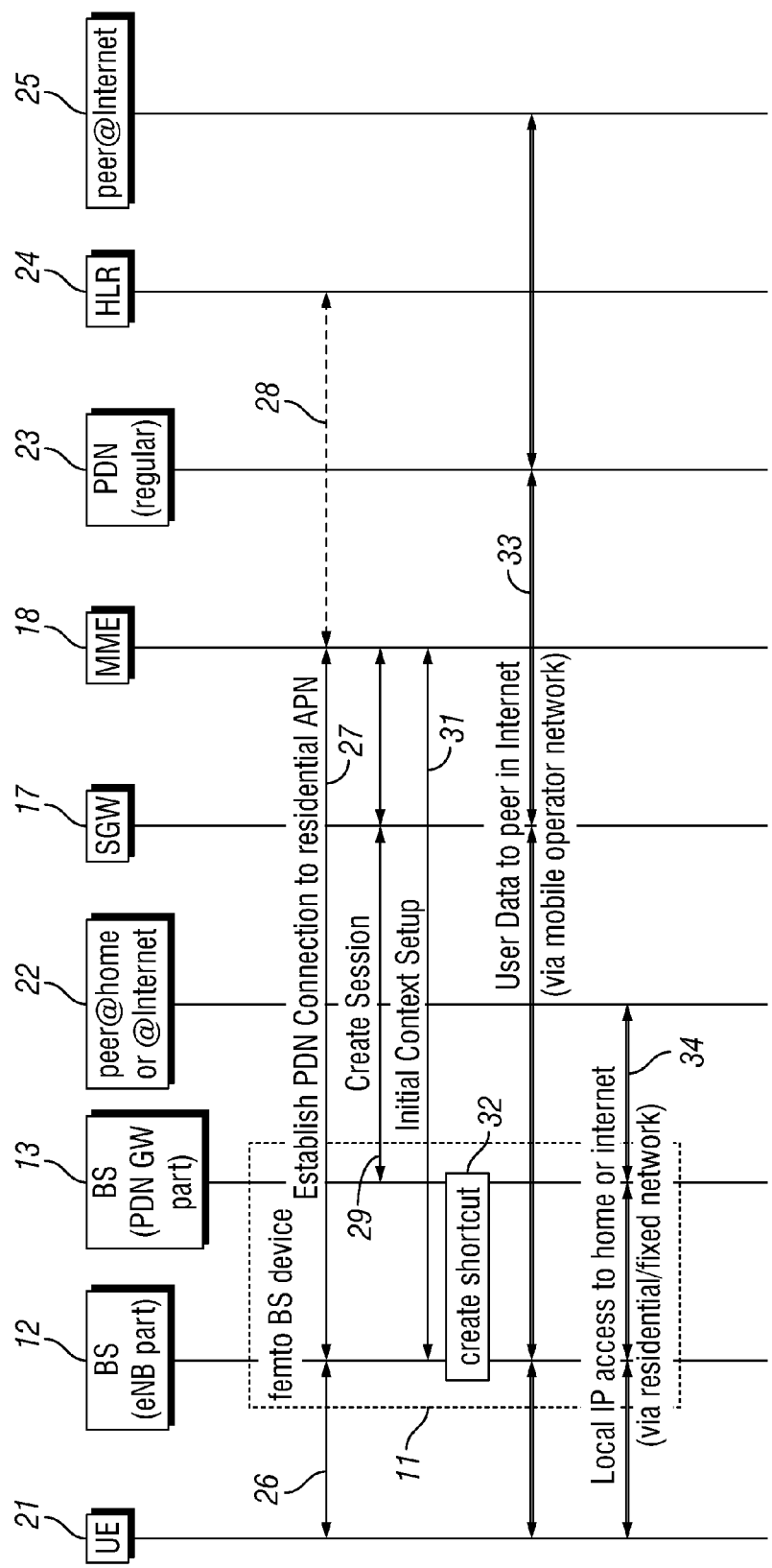
FIG. 2 is a simplified signaling diagram illustrating a procedure in which a UE establishes a PDN connection to the residential APN in an exemplary embodiment of the method of the present invention.

FIG. 2 is a simplified signaling diagram illustrating a procedure in which a UE 21 establishes a PON connection to the residential APN in an exemplary embodiment of the method of the present invention. The procedure is conducted between the UE 21, the femtoBS device 11 with the femtoBS (eNB) part 12 and PDN GW part 13, a peer 22 in the home network 14 or the Internet, the SGW 17, the MME 18, the regular PDN 23, the UE's Home Location Register (HLR) 24, and a peer 25 in the Internet.

At 26, the UE 21 sends a request to the femtoBS part 12 to establish a PDN connection. At 27, the femtoBS part forwards the request to the MME 18, which may optionally check with the UE's HLR 24 to verify that the UE is authorized for this service at 28. The request may include the residential APN indicating that the request is for local IP access. The gateway selection mechanism in the MME selects the PDN GW part 13 to serve the connection based on the residential APN and the UE's IMSI, and at 29, a session is created between the PDN GW part and the SGW 17. At 31, initial context setup is performed, and at 32, the femtoBS device 11 creates the shortcut of the GTP tunnels to the SGW. The shortcut enables traffic to be routed directly between the femtoBS part 12 and the PDN GW part 13. Thereafter, the UE can exchange data with the peer 25 in the Internet via the mobile operator network at 33, or with the peer 22 in the home network or Internet via the residential/fixed network 14 and the residential gateway 15 at 34.

Note that when the UE 21 is in idle mode and a downlink packet arrives at the PDN GW in the PDN 23, the downlink packet is first sent to the SGW 17, which then triggers the paging at the MME 18, causing the UE to become connected. If the UE is located at its home cell, the pairing between the PDN GW context and the HeNB context may be set up as described above. However the first packet(s) that trigger paging would still go via the SGW.

Disabling Remote Access

The MME may allow connectivity to the residential APN only if the UE is actually at that cell. This would disable remote access to the residential LAN. Similarly, if the UE moves out of the femtocell in active mode or sends a TAU from another cell, the PDN connection to the residential GW may be removed. This feature may or may not be required depending on operator requirements.

Note that it may not be possible to release the local PDN connection immediately after the UE leaves the home cell, because in idle mode the TAI list or the ISR functions imply that the UE might not send any signaling when it moves out of the home cell. So the network does not become aware that the UE has left. A UE-initiated release of the PDN connection when the UE leaves the femtocell has the big disadvantage that it would bring the UE to connected mode, which is not desirable due to high battery usage and extra signaling. If the PDN GW can drop the downlink as well as the uplink IP packets if the UE is not located in the home cell, remote access can be disabled even without releasing the PDN connection for local IP access. This can be performed in two alternative ways as follows.

In a first alternative, if the UE is not connected to the home node, the PDN GW within the home node drops uplink and downlink packets, except the initial packets of a downlink burst so that the UE can be paged. This alternative effectively blocks the usage of the PDN connection, even though some initial downlink packets might still reach the UE even if it is out of the home cell. The rules are as follows:

If the PDN GW receives an uplink packet, the PDN GW determines whether the PDN GW context is paired with a Home eNB context and if not, the packet is dropped.

If the PDN GW receives a downlink packet and the PDN GW context is paired with a Home eNB context, the packet is delivered; otherwise The packet is delivered to the SGW, which triggers the paging of the UE.

Two timers are started: a short timer t1 (which is set so that the paging process should finish within t1) and a longer timer t2 (which is set, for example, a few times higher than t1). Until t1 expires, further packets are also delivered to the SGW. After t1 has expired, no more downlink packets are delivered to the SGW until t2 expires. When t2 expires, both t1 and t2 are reset and new packets are again delivered to the SGW. If the UE becomes connected in the meantime in the home node, both timers are reset and the downlink packets are delivered to the UE.

A special variant of the first alternative does not use timer t2. Instead, if a downlink packet arrives and the incoming packet is forwarded to the SGW, but the UE does not become connected in the home node within time period t1, then the PDN GW within the home node deactivates the PDN connection used for local IP access. This decreases the likelihood that further downlink packets are forwarded to the SGW in vain.

Yet another variant of the first alternative is that for any uplink packet that is received in the PDN GW in the home node when the UE is not connected to the home node, the PDN GW drops the packet and also deactivates the PDN connection.

In a second alternative, uplink packets are dropped in a manner similar to the first alternative. For a downlink packet, paging is performed locally in the home node and only if the UE is located in the home cell is the packet delivered. The rules are as follows.

If the PDN GW receives an uplink packet, the PDN GW determines whether the PDN GW context is paired with a Home eNB context and if not, the packet is dropped;

If the PDN GW receives a downlink packet and the PDN GW context is paired with a Home eNB context, the packet is delivered; otherwise The PDN GW locally pages the UE in the home cell (without involving the MME or SGW). If the UE becomes connected (within a timeout period) and the Home eNB context can be paired with the PDN GW context, the packet is delivered to the UE; otherwise the packet is dropped.

The last step involves locally paging the UE by the home node (i.e., femtoBS). However paging requires the knowledge of the UE-specific paging occasion index normally known only by the MME. However, the home node can also know the index since the IMSI is known in the PDN GW context and the index is derived from the IMSI.

Once the UE has left the home cell (either in connected mode or in idle mode), the PDN connection for local IP access can be deactivated, preferably after a latency period. Introducing such latency, as opposed to immediate release of the PDN connection, helps reduce the session management signaling that could otherwise be quite significant if there is a PDN connection setup/release each time the user crosses the boundary of the home cell.

This process can be supported in the PDN GW part of the femtoBS as follows. The PDN GW part of the femtoBS introduces a timer that is started whenever a PDN connection for local access is initiated without a paired Home eNodeB context. The timer is reset to zero each time the femtoBS gets a Home eNB context paired to the PDN GW context. When the timer (with a configurable timeout value) expires, the femtoBS initiates the paging of the UE in the home cell. If the Home eNodeB context is not re-established within a fixed period of time (i.e., if the UE was not in idle mode camping on the home cell), then the PDN GW part of the femtoBS initiates the release of the PDN GW connection.

In a variation of this process, if the PDN GW part of the femtoBS knows, based on the RAT-type IE, that the UE is in another RAT, then paging can be skipped. A shorter timeout value may also be applied for this case.

It should be noted that the above functionality to release the PDN connection for local IP access in case remote access is disabled could also be placed on the MME, but that has a disadvantage: release would not work in case the UE moves to another MME/SGSN, which may even be a legacy SGSN.

Additionally, the UE may also do the release on its own. The risk with a UE-based release is that having many UEs that release the PDN connection too quickly may load the network, and doing a release in idle mode unnecessarily brings the UE to connected mode. So if the release is done by the UE, it is advantageous for the release to be delayed, and preferably done in connected mode. In one embodiment, the UE releases the PDN connection after leaving the home cell in connected mode when a timeout t1 expires. The UE releases the PDN connection after leaving the home cell in idle mode when a timeout t2 expires, wherein t1 may be less than t2.

Other variations of the present invention are also possible. In one embodiment, remote access is allowed for a connection started locally. This embodiment skips any functionality to disable remote access even if a connection for local IP access was started as a non-remote connectivity. This enables the user to continue a local IP access session even when moving away from the home cell. This corresponds to remote access, though in comparison with full remote access functionality, there may be a limitation that the connection must be started within the home cell.

In another variation of this embodiment, remote access is allowed for a connection started locally, but the PDN connection for local IP access is deactivated after a timeout has expired since the UE was last connected in the home cell. The PDN GW, for example, may initiate the deactivation of the PDN connection.

In another embodiment, the MME may enable or disable the optimization explicitly or using the first method of pairing the GTP tunnels. This may be required, for example, when the Serving GW needs to perform a legal intercept of UE traffic.

Figure 3C:
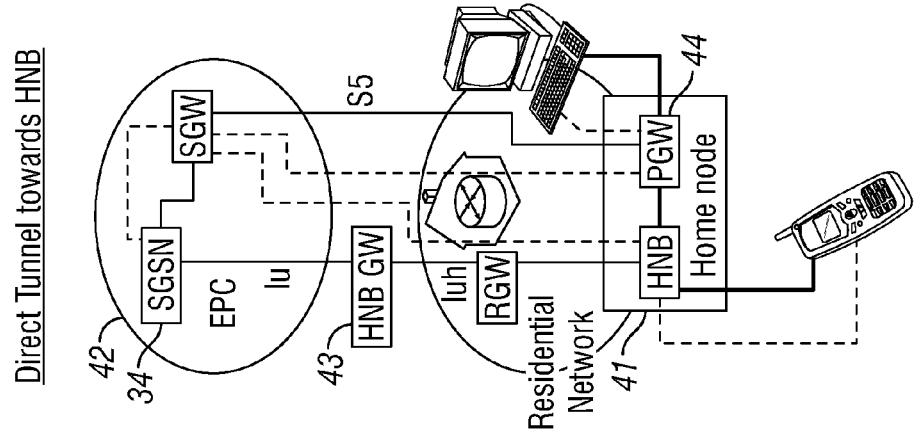
FIGS. 3A-3C are simplified block diagrams illustrating alternative configurations for the 3G case with an Evolved Packet Core (EPC)
Figure 3B:
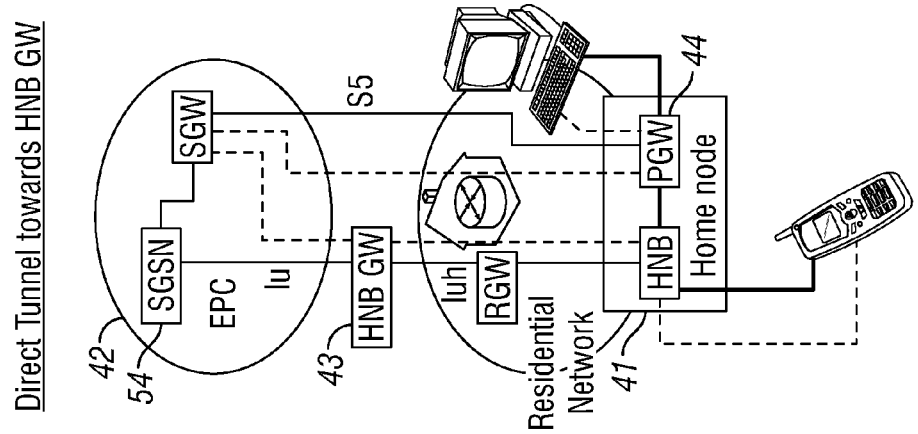
Figure 3A:
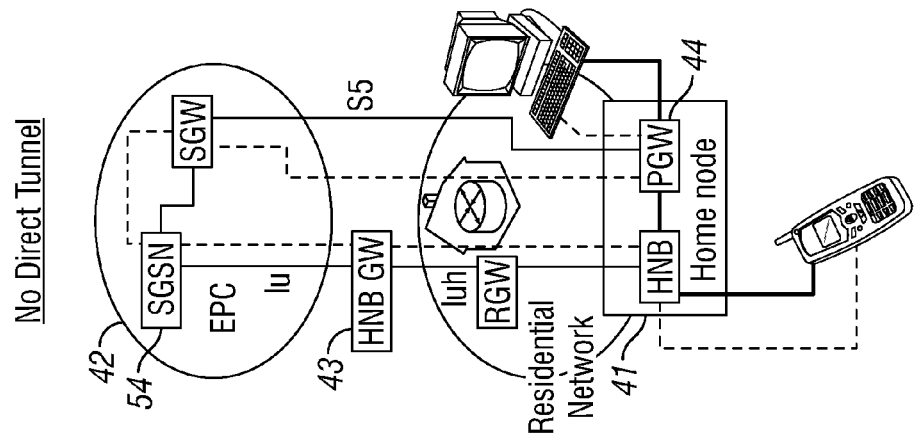

FIGS. 3A-3C are simplified block diagrams illustrating alternative configurations for the case of a 3G Home NB 41 operating with an EPC 42. The present invention is also applicable for 3G Home NBs with the relevant modifications. In each alternative, the normal flow of traffic is shown by the solid line, and the flow of traffic through the shortcut is shown by the dashed line. FIG. 3A illustrates an embodiment without the Direct tunnel feature. FIG. 3B illustrates an embodiment with Direct tunnel traffic going to the HNB GW 43. FIG. 3C illustrates an embodiment with Direct tunnel traffic going directly to the home node skipping the HNB GW. The home node includes a subset of PDN GW functions (PGW) 44.

Figure 4C:
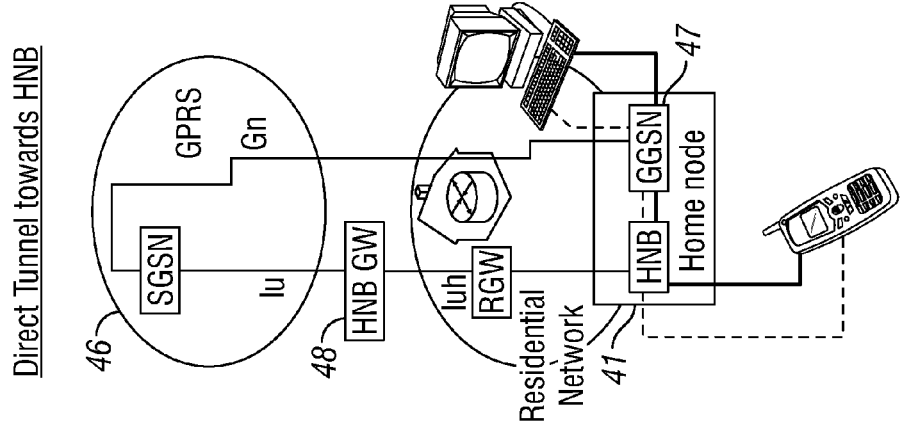
FIGS. 4A-4C are simplified block diagrams illustrating alternative configurations for the 3G case without an EPC.
Figure 4B:
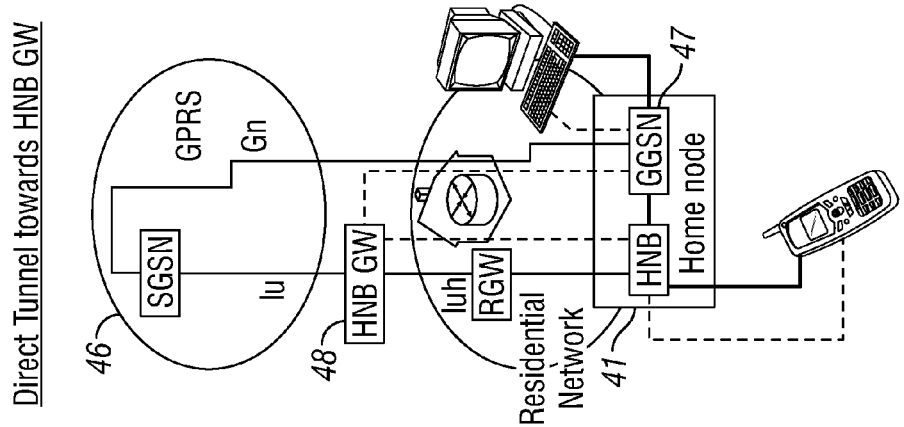
Figure 4A:
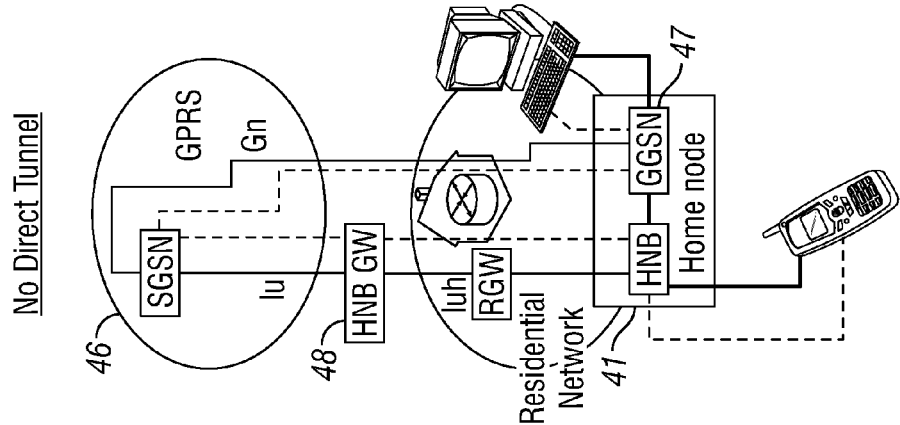

FIGS. 4A-4C are simplified block diagrams illustrating alternative configurations for the case of a 3G Home NB 41 without an EPC, for example with a GPRS network 46. The home node includes a subset of Gateway GPRS Support Node (GGSN) functions 47. FIG. 4A illustrates an embodiment without the Direct tunnel feature. FIG. 4B illustrates an embodiment with Direct tunnel traffic going to a HNB GW 48, FIG. 4C illustrates an embodiment with Direct tunnel traffic going directly to the home node skipping the HNB GW. Note that for the case of a direct tunnel going directly to the home node, the direct tunnel mechanism already realizes the shortcut functionality. Therefore, in that case there may be no need for an extra shortcut mechanism in the home node.

For the 3G case, the present invention is applicable with the relevant modifications. For example, instead of the S1 interface, the invention utilizes the Iu and Iuh reference points and the corresponding messages on those reference points.

NAT in the Terminal

For certain types of mobile terminals, it may be a disadvantage that the terminal has two PDN connections in parallel: one to the 3GPP operator's network and one for local IP access. The operator system and/or the applications might not easily cope with two PDN connections and possibly two different IP addresses on the same interface.

One way to overcome this potential problem is to perform Network Address Translation (NAT) within the terminal itself. For example, for the traffic on the local network, the terminal device driver may perform NAT to replace the local IP address with the IP address assigned by the operator and thereby present only a single IP address on the API towards the operating system and applications. This requires a filter in the terminal that maps uplink packets to either the PDN connection for local IP access or to the PDN connection for the operators network. This filter may be based on the UE's address and subnet mask, and possibly other filter criteria configured into the terminal, or received by a configuration protocol.

Figure 5:
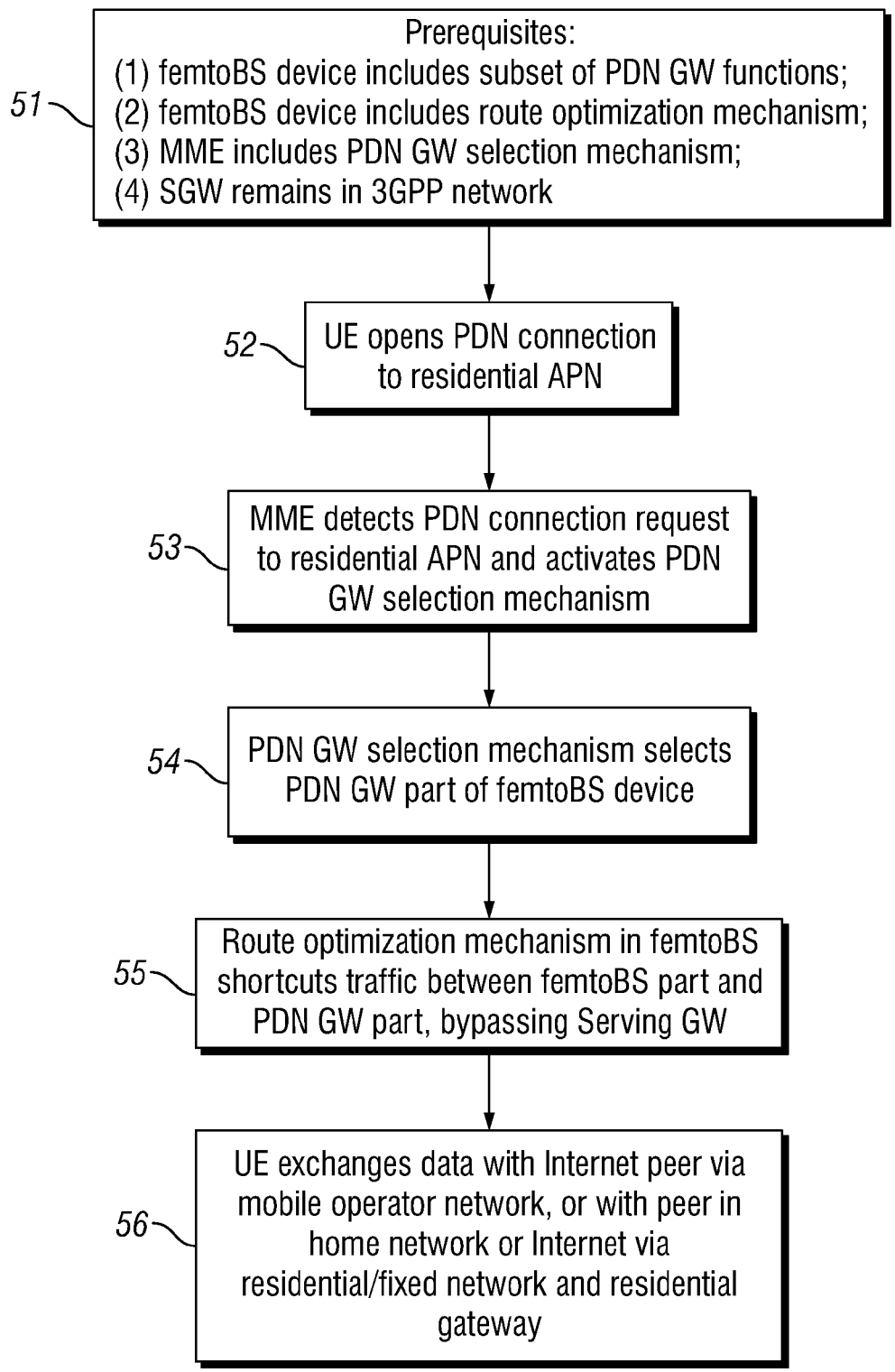
FIG. 5 is a flow chart illustrating the steps of an exemplary embodiment of the method of the present invention.

FIG. 5 is a flow chart illustrating the steps of an exemplary embodiment of the method of the present invention. As noted above, there are different ways for the MME 18 to determine that the PDN connection request is a request for local IP access. For example, the residential APN may be included in the request, or an IMSI-based analysis may be performed. In the embodiment illustrated in FIG. 5, the residential APN is utilized.

At step 51, a number of prerequisites are listed. This embodiment presumes (1) the femtoBS device 11 includes a subset of PDN GW functions; (2) the femtoBS device includes a route optimization mechanism; (3) the MME 18 includes PDN GW selection mechanism; and (4) the SGW remains in the 3GPP network. At step 52, the UE opens a PDN connection to the residential APN. At step 53, the MME detects the PDN connection request and in response, activates the PDN GW selection mechanism. The PDN GW selection mechanism recognizes the residential APN and determines that the UE has requested local IP access. At step 54, the PDN GW selection mechanism selects the PDN GW part 13 of the femtoBS device to serve the connection. At step 55, the route optimization mechanism in the femtoBS device shortcuts traffic between the femtoBS part 12 and the PDN GW part 13, bypassing the SGW 17 in the operator's core network. At step 56, the UE exchanges data with the Internet peer 25 via the mobile operator network, or with the peer 22 in the home network or Internet via the residential/fixed network 14 and the residential gateway 15.

As described above, the present invention advantageously enables a UE in a femtoBS scenario to communicate simultaneously with devices in the residential network, with external networks or operator services via EPC, and over the Internet through the ISP fixed access. Moreover the invention enables the UE to remotely connect to the residential network and to seamlessly handover to and from the residential network, both for traffic to the residential network and elsewhere.

With the invention it is possible to configure multiple IMSIs (for example, family members) to have access to a specific residential network. It is also possible (using multiple residential APNs) to allow a UE access to multiple residential networks (potentially at the same time). The residential network may be implemented in any known technology such as routed or switched, NAT-ed or public addresses, IPv4 or IPv6, co-located or separate CPE, and the like.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method in a Long Term Evolution (LTE) radio access network of connecting a mobile user equipment (UE) through a femto base station, femtoBS, device, to local devices in a local network, the method comprising the steps of:
    receiving in the femtoBS device, a request from the UE to establish a packet-switched data connection for a Packet Data Network (PDN) connection to a 3GPP operator network, the femtoBS device including a femtoBS part, the femto BS part comprising a Home eNodeB, and a Packet Data Network (PDN) gateway part and not including a serving gateway (SGW) part, the PDN gateway part comprising a subset of 3GPP operator network PDN gateway functions implemented in, or in communication with, the femtoBS part;
    forwarding the connection request to a Mobility Management Entity (MME) in the 3GPP operator network;
    determining by the MME that the request is for local IP access;
    in response to determining that the request is for local IP access, activating a gateway selection mechanism in the MME, and selecting the PDN gateway part of the femtoBS device to serve the connection;
    upon establishment of the connection, routing traffic directly between the femtoBS part and the PDN gateway part of the femtoBS device while bypassing a SGW in the 3GPP operator network, the PDN gateway part providing direct access to the local network;
    wherein:
        the femtoBS device routes traffic directly between the femtoBS part and the PDN GW part of the femtoBS device by shortcutting first and second GPRS Tunneling Protocol (GTP) tunnels (S5, S1U) between the femtoBS device and the SGW in the 3GPP operator network, the first GTP tunnel connecting the femtoBS part and the SGW, and the second GTP tunnel connecting the SGW and the PDN GW part;
        the shortcutting comprises pairing the first and second GTP tunnels by the femtoBS device, the pairing including:
            receiving in a bearer setup message sent over an S1 interface from the MME to the femtoBS device, an identifier being utilized on an S5 interface between the Serving Gateway and the PDN GW part; and
            utilizing the S5 identifier to pair the first and second GTP tunnels.

2. The method as recited in claim 1, wherein the step of determining that the request is for local IP access includes detecting that the request includes an Access Point Name, APN, that indicates the request is for local IP access.

3. The method as recited in claim 1, wherein the request includes an identifier for the UE, and the step of determining that the request is for local IP access includes determining that a subscription associated with the identifier indicates that local IP access should be provided for the UE.

4. The method as recited in claim 1, wherein the S5 identifier is a Tunnel Endpoint Identifier (TEID) used for an uplink connection at the PDN GW, which is known by the MME.

5. The method as recited in claim 1, wherein the S5 identifier is an International Mobile Station Identifier, IMSI, for the UE together with an Evolved Packet System Bearer Identifier, EBI, being utilized on an S1-C interface between the femtoBS part and the MME.

6. The method as recited in claim 1, wherein the local devices in the local network include a residential gateway connected to a fixed access network, wherein the method further comprises providing Internet connectivity through the residential gateway and a fixed access connection.

7. A Femto base station, femtoBS, device operable in a Long Term Evolution (LTE) radio access network for connecting a mobile user equipment (UE) to local devices in a local network, the femtoBS device comprising:
a memory and a processor coupled to the memory;
a femtoBS part, the femto BS part comprising a Home eNodeB wherein the processor is operable to receive a request from the UE to establish a packet-switched data connection for a Packet Data Network (PDN) connection to a 3GPP operator network and to forward the request to a Mobility Management Entity (MME) in the 3GPP operator network, and not including a serving gateway (SGW) part;
a PDN gateway part implemented in, or in communication with, the femtoBS part, the PDN gateway part comprising a subset of 3GPP operator network PDN gateway functions;
the processor further configured to:
receive from the service node in the 3GPP operator network, an indication that the PDN gateway part of the femtoBS has been selected to serve the data connection; and
bypass a serving gateway (SGW) in the 3GPP operator network by routing traffic directly between the femtoBS part and the PDN gateway part of the femtoBS device upon establishment of the data connection, the PDN gateway part providing direct access to the local network;
wherein to bypass the SGW in the 3GPP operator network includes the processor is configured to:
shortcut first and second GPRS Tunneling Protocol (GTP) tunnels (S5, S1U) between the femtoBS device and the SGW in the 3GPP operator network, the first GTP tunnel connecting the femtoBS part and the SGW, and the second GTP tunnel connecting the SGW and the PDN GW part; and
pair the first and second GTP tunnels by the femtoBS device wherein to pair the first and second GTP tunnels the processor is configured to:
receive, in a bearer setup message sent over an S1 interface from the MME to the femtoBS device, an identifier being utilized on an S5 interface between the SGW and the PDN GW part; and
pair the first and second GTP tunnels using the identifier;
wherein the identifier is selected from:
a Tunnel Endpoint Identifier (TEID) used for an uplink connection at the PDN GW, which is known by the MME;
a specially defined Access Point Name (APN) utilized in the connection request; and
an International Mobile Station Identifier (IMSI) for the UE together with an Evolved Packet System Bearer Identifier (EBI) being utilized on an S1C interface between the femtoBS part and the MME.

8. The femtoBS device as recited in claim 7, wherein the connection request includes an indication that the request is for local IP access, wherein the indication is a specially defined Access Point Name, APN.

9. The femtoBS device as recited in claim 7, wherein the connection request includes an indication that the request is for local IP access, wherein the indication is an identifier for the UE, the identifier being associated with a subscription that indicates that local IP access should be provided for the UE.

10. The femtoBS device as recited in claim 7, wherein the local devices in the local network include a residential gateway connected to a fixed access network, wherein the processor, via the PDN gateway part, is operable to provide Internet connectivity through the residential gateway and a fixed access connection.

11. A Mobility Management Entity (MME) in an Evolved Packet Core (EPC) network in a 3GPP operator network for controlling establishment of a packet-switched data connection for a wireless communication device through a femto base station, femtoBS, device, the MME comprising a memory and a processor coupled to the memory, the processor configured to:
receive, via the femtoBS device, a request by the wireless communication device for a packet-switched data connection to the 3GPP operator network;
determine that the request is for local IP access;
in response to the determination that the request is for local IP access, select a PDN gateway part of the femtoBS device to serve the connection, the PDN gateway part comprising a subset of 3GPP operator network PDN gateway functions, and wherein the femtoBS does not include a serving gateway (SGW) part; and
send an indication to the femtoBS device that the PDN gateway part of the femtoBS device has been selected to serve the connection, thereby enabling the femtoBS device to bypass a SGW, implemented in the 3GPP operator network, by routing traffic directly between a femtoBS part and the PDN gateway part of the femtoBS device upon establishment of the data connection; and
send a bearer setup message over an Si interface to the femtoBS device, the bearer setup message including an identifier being utilized on an S5 interface between the PDN gateway part and a SGW in the EPC network, wherein the femtoBS device uses the identifier to pair first and second GTP tunnels (S5, S1U) between the femtoBS device and the SGW, the first GTP tunnel connecting the femtoBS part and the SGW, and the second GTP tunnel connecting the SGW and the PDN gateway part.

12. The service node as recited in claim 11, wherein the identifier in the bearer setup message is a Tunnel Endpoint Identifier (TEID).

* * * * *

UNITED STATES PATENT AND TRADEMARK OFFICE
CERTIFICATE OF CORRECTION

PATENT NO. : 9,769,852 B2
APPLICATION NO. : 13/263911
DATED : September 19, 2017
INVENTOR(S) : Turanyi et al.

It is certified that error appears in the above-identified patent and that said Letters Patent is hereby corrected as shown below:

On the Title Page

Item (75), under "Inventors", in Column 1, Line 3, delete "Pilisborosjeno" and insert -- Pilisborosjenő --, therefor.

Item (56), under "OTHER PUBLICATIONS", in Column 2, Line 3, delete "China_." and insert -- China. --, therefor.

Item (57), under "ABSTRACT", in Column 2, Line 2, delete "Equipment UE," and insert -- Equipment, UE, --, therefor.

Item (57), under "ABSTRACT", in Column 2, Line 7, delete "request ts" and insert -- request is --, therefor.

On Page 2, Item (56), under "OTHER PUBLICATIONS", in Column 2, Line 2, delete "Praqgue," and insert -- Prague, --, therefor.

On Page 2, Item (56), under "OTHER PUBLICATIONS", in Column 2, Line 3, delete "2008_." and insert -- 2008. --, therefor.

In the Drawings

In Fig. 3C, Sheet 3 of 5, delete Tag "34" and insert Tag -- 54 --, therefor.

In the Specification

Column 1, Line 43, delete "GSM/Edge" and insert -- GSM Edge --, therefor.

Column 1, Line 51, delete "Station" and insert -- Subscriber --, therefor.

Signed and Sealed this
Twelfth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)

Column 4, Line 7, delete "SOW" and insert -- SGW --, therefor.

Column 4, Line 12, delete "SOW" and insert -- SGW --, therefor.

Column 6, Line 42, delete "network and" and insert -- network, and --, therefor.

Column 6, Line 43, delete "selection selected" and insert -- selection of the user-customizable PDN GW for the residential APN. For example, the selected --, therefor.

Column 6, Line 61, delete "API." and insert -- APN. --, therefor.

Column 7, Line 2, delete "PEN GW" and insert -- PDN GW --, therefor.

Column 7, Line 22, delete "NB" and insert -- eNB --, therefor.

Column 7, Line 25, delete "response," and insert -- response. --, therefor.

Column 7, Line 41, delete "SOW," and insert -- SGW, --, therefor.

Column 8, Line 33, delete "PON" and insert -- PDN --, therefor.

Column 9, Line 55, delete "PON" and insert -- PDN --, therefor.

Column 10, Line 55, delete "dropped." and insert -- dropped; --, therefor.

Column 11, Line 21, delete "follows." and insert -- follows: --, therefor.

Column 11, Line 33, delete "dropped." and insert -- dropped; --, therefor.

Column 12, Line 59, delete "48," and insert -- 48. --, therefor.

Column 13, Line 16, delete "API" and insert -- APN --, therefor.

Column 13, Line 21, delete "operators network." and insert -- operator's network. --, therefor.

Column 13, Line 37, delete "includes PDN GW selection mechanism; and (4) the SOW" and insert -- includes a PDN GW selection mechanism; and (4) the SGW --, therefor.

In the Claims

Column 15, Line 15, Claim 7, delete "Femto" and insert -- femto --, therefor.

Column 15, Line 21, Claim 7, delete "eNodeB" and insert -- eNodeB, --, therefor.

Column 15, Line 44, Claim 7, delete "includes the" and insert -- the --, therefor.

CERTIFICATE OF CORRECTION (continued)
U.S. Pat. No. 9,769,852 B2

Column 15, Line 52, Claim 7, delete "device" and insert -- device, --, therefor.

Column 16, Line 49, Claim 11, delete "Si" and insert -- S1 --, therefor.

Column 16, Line 59, Claim 12, delete "The service node" and insert -- The MME --, therefor.